Jan. 24, 1967 G. SHIRLEY 3,300,221

SPINDLE ADAPTER

Filed Sept. 22, 1965

INVENTOR.
GERALD SHIRLEY

BY Norman Blumenkopf
ATTORNEY

United States Patent Office 3,300,221 Patented Jan. 24, 1967

3,300,221

SPINDLE ADAPTER

Gerald Shirley, 111 Lake Ave., Tuckahoe, N.Y. 10707

Filed Sept. 22, 1965, Ser. No. 489,225
9 Claims. (Cl. 274—10)

This invention relates to the automatic record changer technology, and more particularly, to new, useful and outstanding improvements in separate and detachable adapters for those record changers and phonographs which are manufactured with the so-called standard, small diameter spindles which are adapted to receive records which are provided with small holes of about 0.281 inch in diameter.

The earliest records with small diameter holes were those designed to operate on turntables rotating at 78 revolutions per minute (r.p.m.). The first record changers, i.e., record players which can handle a plurality of records from a stack of records to provide continuous playing without interruption, of the drop type were similarly characterized. Within relatively recent times, there were developed both the long-playing, 33⅓ r.p.m. records and the small (overall) diameter 45 r.p.m. records, the latter, however, being provided with a comparatively large center hole of one and a half inches in diameter, while the former retained the standard small diameter hole.

While a limited number of record players were developed and manufactured specifically and restricted for use with the large diameter hole records, the greatest popular demand was and is for record players, and particularly automatic record changers, with narrow diameter spindles to accommodate the standard 78 r.p.m. records and the long playing 33⅓ r.p.m. large (overall) diameter records, especially since the 45 r.p.m. records can also be played thereon by resorting to special wafer inserts or by the use of adapters provided by each changer manufacturer or others in the business of manufacturing adapters for such uses. The use of the wafer insert did not meet with popular consumer acceptance because of many factors among which the primary ones were inconvenience and inordinate expense. A further deficiency lies in the poor operation of the record changer when such wafer inserts are utilized which is due in the main to poor and defective structural characteristics, especially after several uses of the wafer-inserted record. As a consequence of these several enumerated deficiencies of the wafer inserts, and of the generally quite satisfactory performance of the spindle adapters, the latter represent the major marketable product for playing 45 r.p.m. records on automatic record changers.

Although the consumer is generally satisfied with the presently available spindle adapters, once he has ascertained the proper one to purchase for his particular record changer, the determination of what is the proper spindle adapter for the changer is not as simple as one might think. The basic reason for this quandry lies in the fact that every record changer is more or less structurally different, not the least of such differences being in the center-post or spindle design. Not only are these differences found among the different manufacturers, of whom there are a great number, but different models from the same manufacturer often have different spindle design and structure. These various models may be from the same year or different years, further complicating the already muddled situation. Each and every different spindle design has required a distinct and different spindle adapter. Today there are literally dozens of different spindle adapters, and that amount bodes to be increased several-fold in the very near future as the number of manufacturers increases along with a distressing increase in the model variations. The increase in model variations seems sure to come not only as a natural consequence of our industrial evolutionary process but further because of the advent of the so-called "compact" models with shortened center spindles in response to the demand from manufacturers of portable phonographs and record players for slimmer designs so that carrying cases can be made slimmer, in line with current styling trends.

The present situation, as outlined above, requires distributors and dealers who handle this type of merchandise to stock a great many makes and models of spindle adapters. This is, obviously, burdensome and costly as it not only requires purchasing from myriad sources of supply, but it also uses up valuable storage space, increases inventory-control and record keeping costs, and finally, but certainly, of great importance, it ties up large amounts of capital.

Still further, the aforementioned situation also leads to a great amount of confusion and frustration between the dealer and his customer attending the sale of an adapter. This arises from the failure of the dealer to be able to satisfy the customer's needs, which failure is a direct consequence of the customer's inability to identify, with sufficiency, to the dealer the make and model of his record changer and thereby give to the dealer the information necessary for him to supply the correct adapter. The customer's inability to identify his record changer is not unusual since most record changers are used in assemblies not put together by the record changer manufacturer. The latter situation generally results in any of the manufacturer's identifying means or marks being removed. Even in the case of record changers carrying the maker's name or trademark, it is often difficult if not in many instances impossible for the consumer to find unique identifying data. The final result of this is, often, many trips by the purchaser, back and forth to the dealer, with the buyer attempting to describe what he thinks is some structural characteristic which might help the dealer make an educated guess as to the correct spindle adapter.

Certainly, from both the consumer's point of view, and also from the distributor's and dealer's points of view, there is, to put it mildly, room for improvement. The closest thing to a panacea in this area would be an adapter which could be employed with all presently and, possibly, future developed record changers.

It is, therefore, an object of this invention to provide a spindle adapter for use with narrow spindles to permit the playing of enlarged-center hole records.

It is a further object of the present invention to provide a spindle adapter for use with narrow spindles of varying heights to permit the playing of enlarged-center hole records.

It is still another object of the present invention to provide a universal spindle adapter which can be employed interchangeably on a majority of the presently available narrow spindle record players to permit the playing of enlarged-center hole records.

It is still another further object of this invention to provide a spindle adapter which is so constructed and adjustable so as to permit its employment with narrow spindles of varying shapes and heights, whereby enlarged-center hole records may be played therewith irrespective of the particular record player involved.

Another object of this invention is to provide a record levelling device which is particularly adapted for use with the spindle adapter of the herein disclosed invention.

Other objects will appear hereinafter as the description proceeds.

The objects of the present invention are achieved by providing a spindle adapter which is so constructed that it may be simply and readily manipulated to adjust for differences in the construction and height of the great variety of presently available narrow type spindles used in a majority of record changers. In order to achieve the objects of this invention, the spindle adapter which is herein provided generally comprises three elements, an inverted L-shaped upper section, a generally circular element concentric with and in slidable engagement with the depending leg of the upper section, and an adjustable support means for the spindle adapter. By virtue of the particular construction of the spindle adapter of this invention, the said spindle adapter is supported from the bottom by the aforementioned adjustable support means which rests on the bottom ledge or bearing surface of the narrow spindle of the record changer. This plane of support is usually just slightly below the upper surface of the turntable, and therefore, is just slightly below the plane of the record which is being played. Because the spindle adapter of the present invention is thusly supported from the bottom, in contra-distinction to the presently available spindle adapters, the height of the narrow spindle of the record changer above the push-off finger, which is the actuating mechanism for dropping the records one at a time from the supply stack to the rotating turntable, is of no consequence in the fabrication and use of the spindle adapter of this invention. Because, further, of the specific construction of the spindle adapter of this invention, it is possible to accommodate not only spindles of varying heights but also spindles of varying shapes. In general, narrow spindles are constructed along two major lines, those having a straight or single axis for the entire length of the spindle, and those wherein the upper portion of the narrow spindle is offset from the lower portion thereof.

Still another added feature of the construction of the spindle adapter of the present invention lies in a provision whereby the spindle adapter may be placed on the narrow record changer spindle from the side rather than from the top. This feature permits the utilization of the record changer in very tight quarters, and especially permits the employment of the spindle adapter in locations where it is not possible to obtain clearance over the top of the spindle, at least sufficient to allow the application of an adapter over the top of the narrow record changer spindle.

Still another added feature of tremendous and outstanding importance of the spindle adapter of the present invention lies in the fact that during use thereof there are no moving parts in the spindle adapter. This is in sharp contrast with presently available spindle adapters which incorporate as an integral part thereof a, generally, complex mechanism for translating the motion of the record push-off actuating finger of the narrow record changer spindle to allow the enlarged-center hole records to drop one at a time as required.

The present invention will be more clearly and fully understood and further elaborated upon from the following description with reference to the accompanying drawing wherein.

Figures 1, 2, 3, 4, 5, 6:
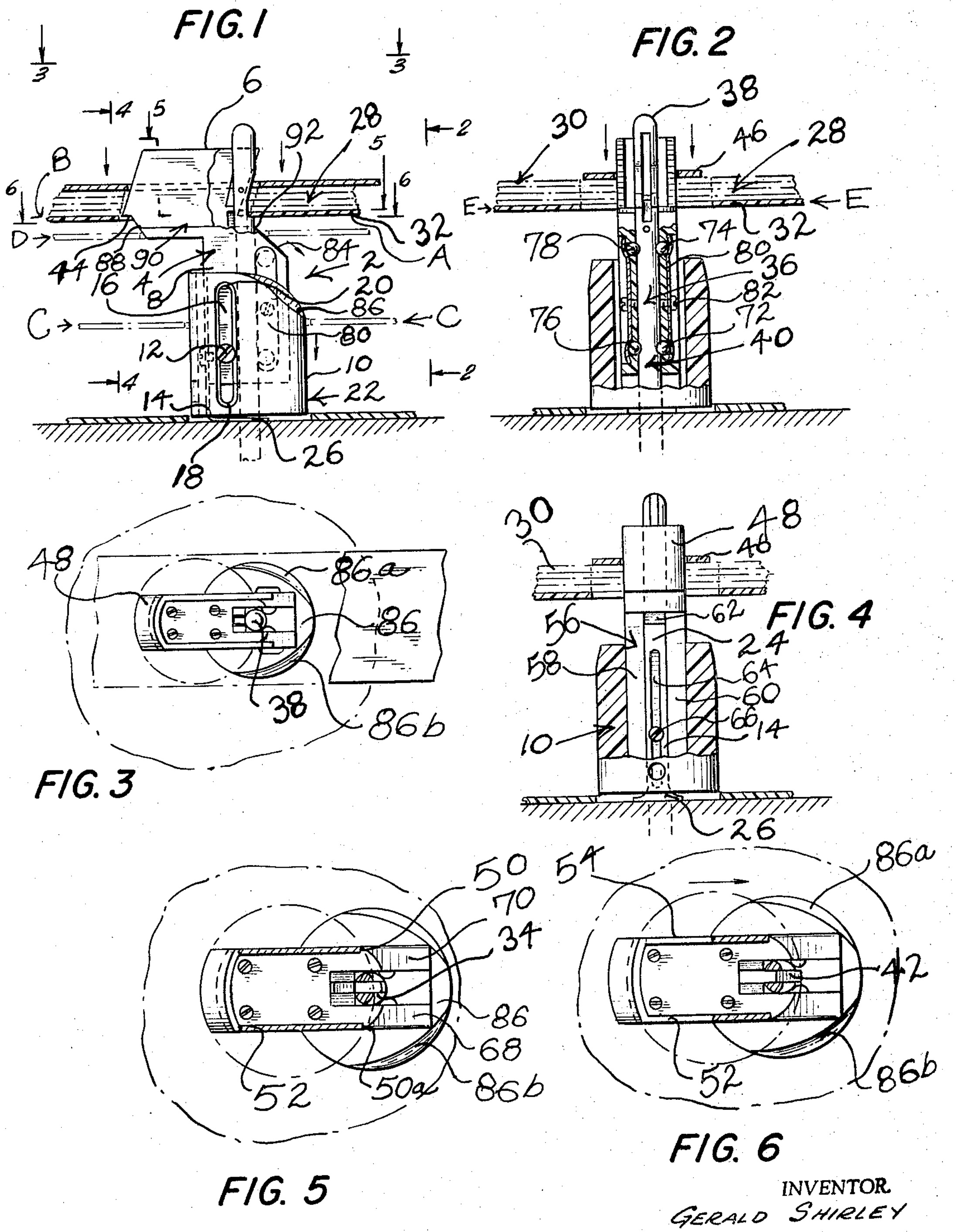
FIG. 1 is an elevational view, partly in cross-section of one form of spindle adapter of this invention in engagement with one form of narrow spindle, the spindle adapter, as shown being provided with a stack of a plurality of records and a preferred form of leveling mechanism.
FIG. 2 is a side elevational view, in cross-section, taken along the line 2—2 of FIG. 1.
FIG. 3 is a top plan view taken along the line 3—3 of FIG. 1.
FIG. 4 is a side elevational view partly in cross-section and partly broken away taken along the line 4—4 of FIG. 1.
FIG. 5 is a cross-section taken along the line 5—5 of FIG. 1.
FIG. 6 is a top plan view taken along the line 6—6 of FIG. 1 and shows the movement of the lowermost record of the stack in response to the action of the pusher finger of the narrow spindle, said movement being translatory in a horizontal plane.

Referring to the drawings in which like reference numerals indicate like parts throughout the drawings, and first specifically to FIG. 1, the spindle adapter 2 of this invention comprises three separate elements:

(1) an inverted L-shaped member 4, which is composed of an upper horizontal portion 6 and a lower vertical portion 8, (2) a tapered element 10 slidably mounted on lower vertical portion 8 and adapted to be secured thereto by any suitable means, such as by locking screw 12 which is fixedly secured to the lower vertical leg portion 8, and (3) an adjustable leg 14 slidably mounted on vertical leg portion 8.

Slot 16 provides for locking tapered element 10 in any position between the bottom 18 of slot 16 and the top 20 thereof. Tapered element 10 is, generally, circular in shape in its cross-sectional dimensions but this is not critical. It is only necessary that the bottom section 22 of element 10 have the same external dimensional characteristics as the center hole of the 45 r.p.m. records which are to be used with the spindle adapter. Still further tapered element 10 is substantially coaxial with lower vertical leg portion 8 and for this association element 10 is provided with an opening for its entire length which conforms internally to the external configuration of the lower vertical leg portion 8, thereby permitting smooth and easy up and down movement and adjustability of tapered element 10 on said lower vertical leg portion 8 within the limits of the length of slot 16. The primary function of tapered element 10 is to receive records as they are dropped for playing on the turntable, and to maintain such records properly centered thereon (i.e. with respect to the narrow turntable spindle).

Adjustable leg 14 is provided to support the spindle adapter in conjunction with the support given by the turntable spindle. Leg 14 comprises a vertical portion 24 and a foot portion 26, generally and, preferably U-shaped to enwrap the turntable spindle. The foot portion 26 is constructed so that it bears on and thereby engages only that portion of the turntable spindle mechanism which is flush with the turntable, and thusly the leg will rest and bear on the only non-rotating surface on the turntable.

In FIG. 1 it will be noted that a stack of records 28 is provided which is composed of individual records 30. The lowermost record 32 of the stack 28 is shown resting on shelf 34 of the turntable spindle 36. This spindle is of the vertical non-offset type, and is comprised of pilot portion 38, which is that section of the spindle above the shelf 34, and a lower segment 40. In addition the turntable spindle contains the conventional ejector finger 42 which is actuated by the turntable mechanism in the usual way. Such turntable spindles are depicted in United States Patents 2,498,333, 2,666,648, 2,918,288, and 2,935,324 among others and the disclosures of such patents relative thereto is hereby incorporated by reference thereto.

By further reference to FIG. 1 as well as FIGS. 2 and 4, it will be observed that the stack of records 28 is maintained in a perfecttly level position while in stack form on element 6, and there is no tendency for the stack or the records of the stack to have any vertical rotation so that point A on record 32 moves upwardly and point B moves downwardly. This vertical rotation would normally occur if record 32 were the only record in the stack due to the fact that said record 32 is supported at only one point (or, more correctly, at only a small arc of the internal edge of the record) which is where the internal edge of the record rests on the shelf 34 of the record player spindle. It will further be observed that the lowermost record 32 when it is resting on shelf 34, has its upper surface just below overhang portion 44. This construction, then, would permit record 32 to rotate, or tilt with shelf 34 as the axis of rotation and resulting in the aforementioned upward movement of point A and downward movement of point B. As long, however, as there are at least two records in the stack of records, this rotation of the lowermost record cannot occur because the record immediately above cannot rotate vertically in the same manner that the lowermost one can when it is the only record in the stack. The reason for this lies is the unique construction of the lower portion of the horizontal section 6. Firstly, it will be perceived that the cross-sectional dimensions of section 6 are such that the circle circumscribed thereabout is identical to the internal diameter of the records in the stack. This structural feature is absolutely critical at the lower end of the horizontal section 6 for at least the height, above overhang portion 44, equal to the thickness of one record. It is desirable to maintain these critical dimensions for a height greater than the thickness of one record not only to insure foolproof operation of the adapter of this invention but also from the point of view of simplicity of fabrication. Above the aforestated critical height, the cross-sectional characteristics of the horizontal portion 6 are not demanding and may take any desired shape or form provided, of course, that the circle circumscribed thereabout cannot be larger than the center hole of the record. It will be noted that in the drawings the cross-sectional dimensions of horizontal portion 6 are essentially constant throughout its entire height as a consequence of the parallelism of rear walls 48 and front walls 50 and 50*a*, on the one hand, and a similar parallelism of walls 52 and 54 on the other hand, the said four walls substantially defining the cross-sectional characteristics of horizontal section 6. This type of construction, as pointed out above, is not critical but only illustrative. As a matter of fact it is more preferred that the cross-sectional dimensions of horizontal section 6, at the upper end thereof, be such that the circle circumscribed thereabout be much smaller than the equivalent circumscribed circle at the lower portion of element 6. This would then, obviously, permit the use of record player spindles having pilot sections of unusual or extreme angular disposition with respect to the vertical or remainder of the spindle, because the resultant circle defined by the very top of the pilot and the area of the horizontal section 6, i.e. a circle which would circumscribe both, would still not be larger than the center hole of the enlarged center hole records with which the adapter of this invention is to be employed.

Now it can be clearly understood that the particular construction of the lower portion of element 6 results in all of the records in the stack being prefectly level and that only the lowermost record will drop in response to the ejector finger of the turntable spindle and that this situation will continue so long as there are two or more records in the stack. When there is only one record left in the stack, and it is resting on shelf 34, this record will tilt or rotate, as described above, since the point on the edge of the record opening diametrically opposed to the point resting on the shelf 34 is no longer bound by frictional forces to wall 48 due to the depicted undercut which produces the overhang 44. The purpose of the latter, of course, is to permit a horizontal, translatory motion of the lowermost record which is resting on shelf 34. When the lowermost record 32 is pushed horizontally as a result of the movement of ejector finger 42, the inner edge of the record, previously resting on shelf 34, is now free to fall into its proper position on the turntable for playing purposes. The actions described above proceed smoothly when there is more than one record in the stack. With the last record, however, in order to prevent a tilt, and therefore, a malfunctioning of the record player, it is necessary to provide some means to maintain the last record in a level position while on the shelf awaiting the drop on to the turntable. While numerous means and techniques can be employed for this purpose, by far the most efficient, simplest, foolproof, and overall useful mechanism is the one which is a part of the present invention and is denoted by numeral 46. Means 46 is a follower so constructed that it can be placed on the stack of records as if it were another record, and this follower will drop with the stack as the records are played. When the last record in the stack is resting on shelf 34, it will remain level due to the follower resting thereon. The follower cannot tilt for the same reasons that records above the lowermost records cannot tilt or rotate: in other words the internal dimensions of the opening in the follower are made to conform to the external dimensions of the lower section of horizontal portion 6. The opening in the follower can also be similar to the dimensions and shape of the opening in the enlarged center-hole records, but it is preferred to have the opening as first described since this permits a more foolproof operation. It is also essential that the thickness of the follower be at least greater than the thickness of one record so that after the last record has dropped the follower will fall on to shelf 34 but the edge opposite the edge resting on the shelf will still engage wall 48, and the top surface of the follower will not be below the overhang 44.

In addition to the frictional forces which prevent tilt or rotation of the follower, it is, also, so constructed that the major portion of its weight is brought to bear in opposition to and on that portion of the record which would tilt upwardly.

With further reference to horizontal section 6, it is shown as generally U-shaped in cross-section. Again, as pointed out above the shape is not critical and could just as well be circular, but in any event, the element 6 is provided with a vertical slot or opening to permit the axial association with the turntable spindle, and in so far as the section 6 is concerned, axial association with the pilot portion of the turntable spindle.

Similarly, lower vertical portion 8 is provided with a vertically extending slot or opening to receive the lower portion 40 of the turntable spindle 36. This vertical slot is defined by rear wall assembly 56 which is composed of sections 58 and 60 and a depressed central section 62. Adjustable leg 14 is constructed, and particularly vertical portion 24, to fit into section 62 and be slidable therein. Slot 64 in vertical section 24 of leg 14 permits vertical movement and thereby adjustment of leg 14 within the depressed section (groove) 62. Fixing the position of leg 14 at any point between the bottom and top of slot 64 is attained by means of locking screw 66. In addition to rear wall assembly 56 in defining the opening to receive the turntable spindle, there are also side walls 68 and 70. Associated with the said side walls are suitable means for fixedly securing the turntable spindle and the adapter of this invention. One suitable, simple, and effective means is provided by spring-loaded balls 72, 74, 76, and 78. As shown in FIG. 2, spring-loading is effected by a piece of spring metal 80 imedded in a groove in each of the side walls 68 and 70. The spring is depicted secured in the groove by a screw 82. The ends of the spring apply a pressure to the balls 72, 74, 76, and 78, which are inserted into the groove and positioned in holes slightly smaller in diameter than the balls, thereby preventing the balls from falling through the said holes.

With still further reference to the drawings, it will be seen that at the upper section or end of vertical portion 8, there is a sloping section 84 to provide a means whereby the dropped records are smoothly directed to a position where they can drop into proper position on the turntable without the record or records jamming during the drop. To facilitate the smoothness of the "drop," slidable element 10 is provided with a tapered portion at the upper end thereof. These tapered portions 86, 86*a*, and 86*b* are generally shaped to provide a smooth curve from the point of release of the record from shelf 34 until it is in the approximate position indicated by "C." From the latter point the record has a usual vertical drop to the turntable. Position "D" of the record is indicated in FIG. 1, and it is from this position that the record is guided by the sloping section 84 onto tapered portion 86 and thence to position "C." Between position "D" and position "E," which is the position of the lowermost record in the stack which is resting on the shelf 34, there is an intermediate portion of the inverted L-shaped member 4, part of which can be considered to be a portion of horizontal element 6 and part a portion of vertical element 8. The rearward portion 88 of this intermediate portion 90 and the forward portion 92 of same define, in cross-section, an area the circumscribed circle about which has a diameter equal to the diameter of the enlarged hole of the records. In other words, the characteristics of this intermediate portion are similar to those of the bottom portion of element 6 just above the overhang 44, but the intermediate portion is horizontally displaced vis-a-vis the bottom portion of element 6 so that the record can be guided smoothly through the various positions "E," "D," and "C."

To utilize the spindle adapter of this invention and utilize it with a record player is an exceedingly simple operation and requires but two simple adjustments for any given player. First, the spindle adapter is slipped on to the record player spindle and engaged therewith by means of the locking ball bearings 72, 74, 76, and 78. Then the vertical positioning is done by placing the shelf of the record player spindle, i.e. the point where the ejector finger actuates the movement of the lowermost record to permit the said record to drop on to the turntable, so that the lowermost record in the stack is resting on this shelf and is just below the overhang 44, all this, of course, while maintaining the record or records perfectly level. In this position, it will be noted that the adjustable leg 14 is above the turntable. It is, therefore, adjusted by means of the locking screw 66 so that it rests firmly on the shoulder of the record player spindle. The final adjustment is the lowering of slidable element 10 so that it is just above the rotating turntable and in this position the said element 10 is secured as by locking means 12. After placing any desired number of records on upper horizontal section 6, there is then placed over the records the follower 46 for the purposes hereinbefore described.

Once the spindle adapter has been set and adjusted for a given record player as described above, it can be used time and time again without any further adjustments, and should it be desired or necessary to remove the spindle adapter and use it with another or different record player the two simple adjustments described above will suffice to accomplish this result.

It is, of course, understood that many variations in the specific construction of the device of the present invention can be made without departing from the spirit and scope of what is taught and disclosed herein. Thus, tapered, slidable element 10 can be constructed so that it is generally U-shaped, in other words with a vertical slot in alignment with the vertical slot of vertical portion 8. This particular feature would permit the sidewise mounting or application of the spindle adapter to the record player spindle. Such a modification is especially useful, if not indeed, necessary, where there is little or no clearance to mount the adapter from the top of the record player spindle.

I claim:

1. An adapter for a record player spindle to adapt said record player to play enlarged center hole records comprising:
   (1) a slide for movable mounting on a spindle, said slide having
      (a) an upper horizontally extending stacking member, and
      (b) a lower vertically extending channel member for slidably receiving a spindle,
   (2) foot means adjustably secured to said channel shaped member for supporting said adapter and engaging said spindle to limit the position of said adapter relative to a spindle, and
   (3) a casing surrounding said channel shaped member adjustably secured to said channel shaped member for receiving records thereon to center the records,
said stacking member including shelf means for holding a record in a horizontal position offset from said casing so that records can be stacked on said shelf means, and subsequently, in a step by step manner be horizontally moved into alignment with said casing.

2. An adapter according to claim 1 wherein said foot means includes an L-shaped member having a lower bifurcated portion adapted to embrace said record player spindle.

3. An adapter according to claim 1 wherein said casing is tapered upwardly for facilitating reception of records thereon.

4. An adapter according to claim 3 wherein said casing has a slot therein aligned with the channel of said channel shaped member, thereby adapting said adapter for sidewise mounting on a turntable spindle.

5. An adapter according to claim 1 wherein said stacking member has a lower part offset from the upper part thereof forming said shelf means.

6. An adapter according to claim 5 wherein said offset lower part of said stacking member is less than two records in height.

7. An adapter according to claim 1 wherein said channel shaped member includes means for securing said adapter to a record player spindle.

8. An adapter according to claim 7 wherein the means for securing the adapter to a record player spindle is a spring pressed ball detent locking means adapted to secure the adapter in a substantially vertical position.

9. In a phonograph record player having a rotatable turntable, a center spindle, a spindle adapter as defined in claim 1, and at least one record in substantially horizontal position on said spindle adapter, means to maintain said record in said horizontal position, said means comprising a follower member having a thickness greater than the thickness of one record, and which is adapted to drop with the records in a step by step manner as the records drop similarly.

References Cited by the Examiner

UNITED STATES PATENTS

| | | | |
|---|---|---|---|
| 2,666,647 | 1/1954 | Dale | 274—10 |
| 2,884,255 | 4/1959 | Wennerbo | 274—10 |

NORTON ANSHER, *Primary Examiner.*

C. B. PRICE, *Assistant Examiner.*